April 5, 1966

A. L. MILLER 3,244,396

FLUID FLOW CONTROL VALVE

Filed March 9, 1964

INVENTOR.
AVY L. MILLER
BY Fulwider, Patton, Rieber,
Lee, and Utecht
ATTORNEYS

INVENTOR.
AVY L. MILLER
BY Fulwider, Patton, Rieber
Lee, and Utecht
ATTORNEYS

United States Patent Office 3,244,396
Patented Apr. 5, 1966

3,244,396
FLUID FLOW CONTROL VALVE
Avy L. Miller, 13246 Saticoy St., North Hollywood, Calif.
Filed Mar. 9, 1964, Ser. No. 350,172
12 Claims. (Cl. 251—28)

The present invention relates generally to an improved valve for controlling the flow of fluids, and more particularly to a fluid flow control valve which is itself controlled by the supply of controlling fluid pressure thereto. This application is a continuation-in-part of my prior application Serial No. 294,696, now Patent No. 3,211,373, entitled, "Water Heating Method and Apparatus," filed July 12, 1963, from which a portion of the disclosure was divided.

The use of fluid flow controlling valves which are themselves controlled by a controlling fluid pressure provides several operating advantages, among which are a simplified, rugged and dependable construction, the use of the fluid supply as a source of control pressure to both open and close the valve, and the ready addition of time delay capabilities to the valve control.

In one embodiment of the present invention a pair of diaphragms are interconnected to form power sources for the movement of a valve element to effect its opening and closing movements. One diaphragm may be subjected to the source pressure to effect closing of the valve and the other diaphragm may be subjected to a controlling fluid pressure to open the valve. Where the fluid supply source is used for the controlling fluid pressure on the second diaphragm, it will desirably be larger than the first diaphragm to overcome the force exerted thereby. Where the controlling fluid pressure is independent of and greater than the pressure of the fluid supply source, a single diaphragm may be used.

In a further embodiment of the invention, the supply of controlling fluid pressure is metered so that pressure against the valve opening diaphragm builds up over a predetermined period of time to provide for a time delay in the opening of the valve after the application of control pressure. In this embodiment an unrestricted return passage may be provided to effect immediate closing of the valve upon discontinuance of control pressure.

As a refinement to the time delay embodiment, the invention further contemplates structures to insure positive action of the valve even though it may operate with a time delay. These structures prevent the valve opening slowly or perhaps occupying a position neither fully opened nor closed.

It is therefore an object of the present invention to provide an improved fluid flow control valve operated by the controlled application of controlling fluid pressure thereto.

Another object of this invention is the provision of an improved control valve operating by the controlled application of fluid pressure thereto in which the supply of control fluid is metered to provide a time delay between application of control pressure and the operation of the valve.

Another object of the invention is the provision of an improved time delay valve in accordance with the immediately preceding object in which the metering occurs in the valve opening operation only, and a free return passage is provided for immediate closure operation of the valve.

A further object of this invention is the provision of an improved time delay valve controlled by the metered application of control fluid pressure thereto, including means insuring positive and complete opening of the valve at the expiration of the time delay period.

These and other objects and features of the invention will be readily apparent to those skilled in the art from the following specification and the appended drawings, in which.

Figure 1:
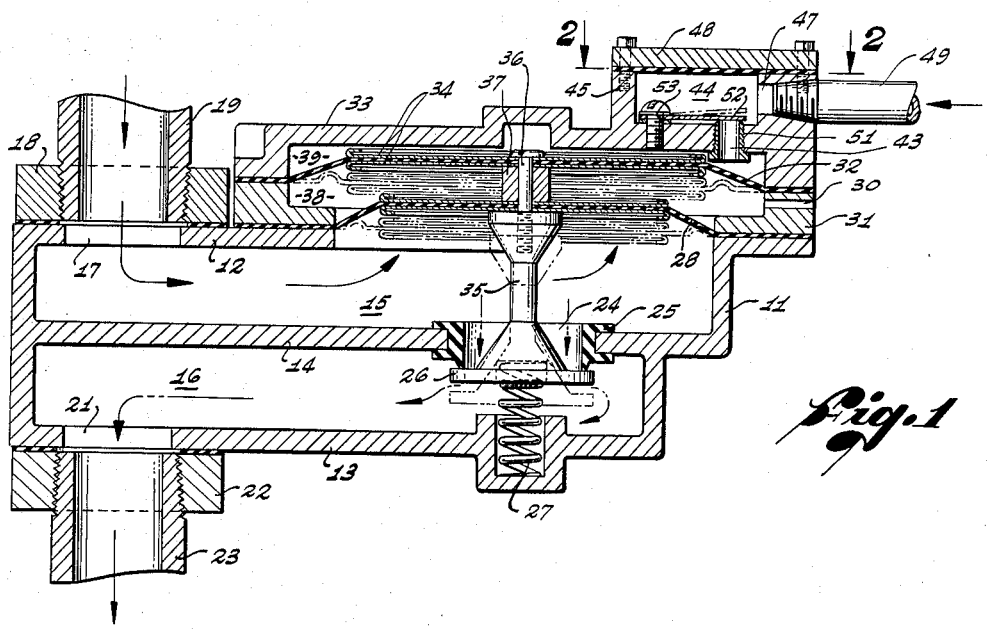
FIGURE 1 is a sectional view through one embodiment of fluid flow control valve according to the present invention.
Figure 2:
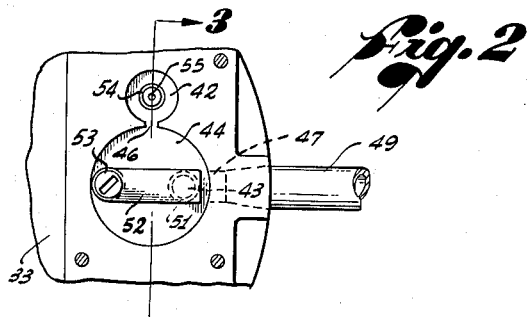
FIGURE 2 is a detail sectional view on the line 2—2 of FIGURE 1.
Figure 3:
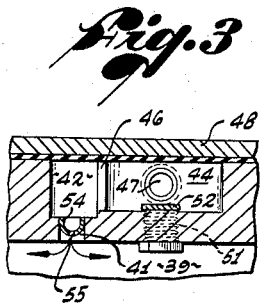
FIGURE 3 is a detail sectional view on the line 3—3 of FIGURE 2.

Referring first to the embodiment of the invention illustrated in FIGURES 1 through 3, there is provided a main body portion 11 having integral top and bottom walls 12 and 13 and an integral intermediate wall 14 dividing the interior of the body portion 11 in to an inlet chamber 15 and an outlet chamber 16. The top wall 12 has an inlet opening 17 therethrough about which is mounted a threaded socket flange 18 having an inlet pipe 19 threaded therein. The bottom wall 13 has an outlet opening 21 therethrough about which is mounted a threaded socket flange 22 having an outlet pipe 23 threaded therein. The intermediate wall 14 has an opening 24 therethrough in which is mounted a valve seat 25, normally closed by a valve plate 26 lightly biased into closed position by a compression spring 27.

A first control diaphragm 28 is mounted against the upper face of the top wall 12 by a spacing ring 31. A second control diaphragm 32 is mounted against the upper face of the spacing ring 31 by a valve cover plate 33, the control diaphragms 28 and 32 being thereby mounted in spaced relation. The central portions of the diaphragms 28 and 32 are conventionally stiffened by opposed discs 34.

The valve plate has an integral generally spool shaped stem 35 extending upwardly therefrom, and the diaphragms 28 and 32 and their stiffening discs 34 are rigidly secured to the stem 35 by a stud 36 and a spacer tube 37 disposed between the diaphragms. The valve plate 26 and diaphragms 28 and 32 thereby are rigidly interconnected to move together as a unit. The chamber 38 between the diaphragms 28 and 32 may be connected to atmosphere at 30, as it performs no function in the operation of the valve.

The chamber 39 between the diaphragm 32 and the valve cover 33 is connected by a first opening 41 with a chamber 42, and by a second opening 43 with a chamber 44, the chambers 42 and 44 being disposed in a boss 45 extending upwardly from the valve cover plate 33. The chambers 42 and 44 are connected by a passage 46 and are sealably closed by a top plate 48. A control inlet 47 leading into chamber 44 has a control fluid pipe 49 threaded therein.

A valve seat 51 is threaded in the opening 43 and is closable by a flap valve 52, of neoprene or similar flexible material, mounted in the chamber 44 by a stud 53 which rigidly secures one end of the flap valve 52 and leaves its other end freely movable into and out of abutting relation with the end of the valve seat 51 to seal or open the same.

A readily replaceable metering member 54 is pressed into the opening 41 and has a restricted metering opening 55 therethrough to restrict the flow of control fluid from chamber 42 into chamber 39. The restricted metering opening 55 provides a predetermined time delay between the application of control fluid pressure at the inlet 47 and the build-up of control pressure within chamber 39 sufficiently to move the diaphragms and valve plate 26 to valve open position. The operation of the fluid flow control valve of FIGURES 1 through 3 is as follows: the valve is shown in full lines in FIGURE 1 in its closed position in which valve plate 26 is held against valve seat 25 by both the light biasing spring 27 (which is preferably sufficient only to oppose gravity opening of the parts) and the force exerted on the under surface of diaphragm 28 by the main fluid supply pressure within chamber 15. In this normal closed position there is no control fluid pressure in the pipe 49 and the pressure within chamber 39 is substantially atmospheric.

When control fluid pressure to be supplied in chamber 39 is derived from the main fluid supply, the effective area of the diaphragm 32 must be greater than the effective area of the diaphragm 28, and this relative area size has been shown in FIGURE 1 of the drawing wherein the effective area of the upper diaphragm 32 is substantially greater than the effective area of the lower diaphragm 28. Upon the application of control pressure, such as the main fluid supply pressure, at the control fluid supply pipe 49, the incoming control fluid passes through inlet 47 into chamber 44 but is prevented from passing through the opening 43 by the closed flap valve 52. The control fluid therefore passes through passage 46 to chamber 42 from which it flows through the restricted metering opening 55 into the chamber 39. After a time delay determined by the size of the metering opening 55, the pressure within chamber 39 becomes sufficiently great so that the force exerted on the larger upper diaphragm 32 overcomes both the force exerted on the lower diaphragm 28 by the supply pressure and the bias of spring 27 so that the diaphragms and the valve plate 26 move downwardly to open the passage 24 and provide for flow of the supply fluid through the valve from the inlet 19 and chamber 15 through the passage 24 to chamber 16 and outlet pipe 23.

As soon as the valve plate 26 starts to uncover the opening 24, pressure within chamber 15 drops rapidly to decrease the upward force on the diaphragm 28 from the pressure within chamber 15. The valve therefore continues its opening movement once the seal at the valve seat 25 is initially broken and, under ordinary conditions, the volume of chamber 39 and the decrease in pressure in chamber 15 are such that the valve plate 26 will make immediate full opening movement into its broken line position shown in FIGURE 1.

When the control fluid pressure at the pipe 49 is cut off with normal return to substantially atmospheric pressure the fluid within chamber 39 is rapidly vented through opening 43 past the flap valve 52, which freely moves to its open, dotted line position, and thence back through the control pipe 49. This return fluid movement therefore occurs without time delay so that the valve plate 26 is moved quickly into its closed full line position under both the bias of spring 57 and the force exerted on the under side of the diaphragm 28 by the pressure within chamber 15.

The time delay provided in the valve operation between the application of control fluid pressure and the opening of the valve may be readily varied by interchanging the metering member 54 with like members having different sized metering openings 55. In this manner different predetermined time delay periods may be provided for. If time delay operation is not desired, either or both the metering member 54 and the flap valve 52 may be entirely removed and the valve will thereafter function as a simple immediate-response control valve. Upon replacement of whichever of the metering member and flap valve were removed, the valve will return to its time delay operation.

It will, of course, be understood that the larger size for the diaphragm 32 is dictated by the possible use of the main fluid supply pressure as the control fluid pressure. Where an independent source of control fluid pressure is used, the diaphragm 32 may be of the same or smaller area as the closing diaphragm 28, or may be omitted entirely and the valve operated by a single diaphragm.

Under certain operating conditions it may be found that the embodiment of the invention illustrated in FIGURES 1–3 is not entirely positive in its action and the plate 26 may not completely seal agains the valve seat 25, or, if the pressure within chamber 15 does not decrease rapidly enough, the plate 26 may move only slowly toward its open position. To prevent this undesired indecisive operation of the valve plate, the embodiments of FIGURES 4 and 5 are designed to insure positive and rapid action of the valve to move the valve plate 26 to fully closed and fully opened positions.

Figure 4:
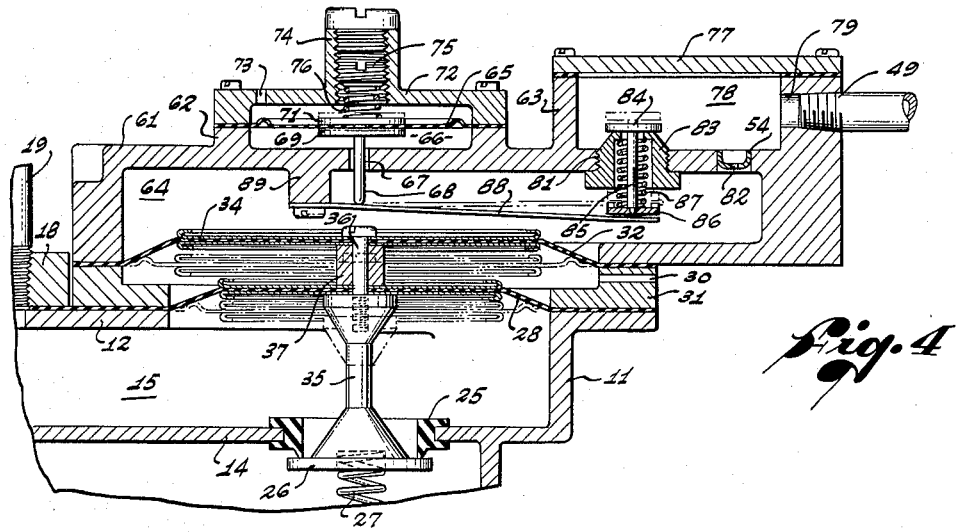
FIGURE 4 is a partial sectional view taken in the same plane as FIGURE 1, but showing a different embodiment of the invention.
Figure 5:
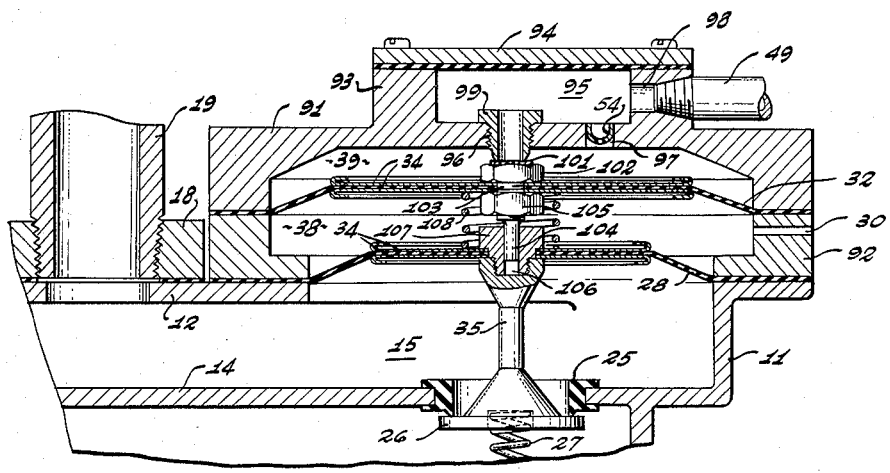
FIGURE 5 is a partial sectional view in the same plane as FIGURES 1 and 4, but showing a further embodiment of the invention.

Referring first to the embodiment of the invention illustrated in FIGURE 4, the parts which are the same as those of FIGURE 1 are given the same reference numerals and it will be understood that the cut-off portion of FIGURE 4 will be the same as the corresponding portion of FIGURE 1. The valve cover plate 33 is replaced by a valve cover plate 61 having a pair of hollow bosses 62 and 63 extending upwardly therefrom. The cover plate 61 mounts the diaphragm 32 against the spacing ring 31 and forms with diaphragm 32 a chamber 64 which conforms in function to the chamber 39 of the embodiment of FIGURE 1.

A flexible diaphragm 65 is mounted against the upper face of the boss 62 to form a chamber 66 therebeneath in free communication with the chamber 64 through an opening 67. A pin 68 extends freely through the opening 67 between chambers 46 and 66 and is rigidly secured to the diaphragm 65 to move therewith by its integral head 69 and an opposed attached disc 71. The diaphragm 65 is sealably held against the boss 62 by a cover plate 72 and suitable studs and the chamber between the cover plate 72 and the diaphragm 65 is vented to atmosphere through an opening 73. The cover plate 72 has an integral tubular boss 74 extending therefrom and internally threaded to receive an adjusting plug 75 which determines the bias exerted on the diaphragm 65 by a compression spring 76 disposed between the adjusting plug 75 and the disc 71 on the diaphragm.

A cover plate 77 is sealably secured to the top of the boss 63 to form a chamber 78 therein into which there is an inlet opening 79 in which is threaded the control fluid pipe 49. A pair of openings 81 and 82 interconnect the chambers 64 and 78 and the metering member 54 is pressed in the opening 82 just as it was in the opening 41 in the embodiment of FIGURES 1–3. A valve seat 83 is threaded into the opening 81 and a valve plate 84 cooperates therewith to seal the opening therethrough. The valve plate 84 is mounted on a stem 85 having a head 86 on its opposite end forming a seat for a compression spring 84 whose other end bears against a shoulder within the valve seat 83 to thereby lightly bias the valve plate 84 against the valve seat 83. A long leaf spring 88 is mounted at one end to an internal boss 89 depending from the valve cover plate 61. The free end of the leaf spring 88 bears against the head 86 on the stem 85 and is sufficiently strong to overcome both the light bias of spring 87 and the differential of the forces exerted on the upper and lower faces of valve plate 84 by fluid pressures within chambers 78 and 64. In the normal, unoperated position of the valve, pin 68 bears against the leaf spring 88 and forces it away from the head 86 sufficiently to permit the valve plate 84 to seal against seat 83 under the bias of spring 87. The necessary force on the pin 68 is secured from the spring 76 whose bias is adjustable by the plug 75.

The operation of the embodiment of the invention illustrated in FIGURE 4 is as follows: the valve is shown in full lines in its unoperated position in which control fluid pressure is not being supplied to pipe 49. The valve plate 26 is therefore seated in sealing relation against the seat 25 by the fluid supply pressure operating against diaphragm 28, as well as by the bias of the spring 27. The spring 76 forces pin 68 against the leaf spring 88 to hold it in inoperative position permitting the valve plate 84 to seal under the bias of the spring 87. With the application of control fluid pressure to open the valve, control fluid enters the chamber 78 through pipe 49 but is prevented from passing through the opening 81 by valve plate 84 sealed against valve seat 83. The control fluid can therefore pass from chamber 78 into chamber 64 only through the metering member 54 in opening 82. With a time delay determined by the size of the restricted metering opening in the metering member 54, pressure in chamber 64 increases until it reaches a value at which the pressure within chamber 66, which is in communication with chamber 64 through opening 67, moves diaphragm 65 and pin 68 upwardly against the bias of spring 76 to free leaf spring 88 to move head 86 and valve plate 84 upwardly against the bias of the spring 87. This uncovers the passage through the valve seat 83 and opening 81 to permit free flow of control fluid into chamber 64 to produce an immediate opening force from the diaphragm 32 to move the valve plate 26 quickly to its full open position.

When the control fluid pressure on pipe 49 is removed, the fluid in chamber 64 returns freely, without delay, through the passage in valve seat 83 and opening 81 since its pressure tends to open the valve plate 84.

The bias on spring 76 is preferably set so that the pin 68 moves upwardly to free leaf spring 88 before the pressure within chamber 64 is sufficient to effect opening movement of diaphragm 32 and valve plate 26. At the critical point at which the pressure on diaphragm 32 is sufficient to initiate opening movement on the valve plate 26, the pressure in chamber 64 and on diaphragm 32 is changing quite rapidly because the passage through the valve seat 83 and opening 81 is open. The embodiment of the invention shown in FIGURE 4 therefore provides for positive, rapid operation of the valve plate 26 to both fully sealed or fully opened position and prevents operation in an indecisive intermediate position.

The embodiment of the invention illustrated in FIGURE 5 also secures positive operation of the valve plate 26, but in a different manner and with different structure than in the embodiment of FIGURE 4. In the FIGURE 5 embodiment, parts which are the same as in FIGURES 1 to 4 have been given the same reference numerals and the cut-off portion is the same. A valve cover plate 91 is here substituted for the valve cover plates 33 and 61 to sealably mount the diaphragm 32 against the top face of a spacing ring 92 which performs the same function as the spacing ring 31, but is somewhat higher to provide a greater space between the diaphragms 28 and 32.

The valve cover plate 91 has a hollow boss 93 extending upwardly therefrom and closed by a cover plate 94 sealably mounted against its upper face to form a chamber 95. A pair of openings 96 and 97 extend through the plate 91 to interconnect the chambers 39 and 95. The boss 93 is provided with an inlet opening 98 into the chamber 95 and into this opening is threadedly mounted the control fluid pipe 49. The metering member 54 is mounted in the opening 97 to provide restricted communication between the chambers 39 and 95. A valve seat 99 is threaded into the opening 96 to extend into chamber 39 to be closed by a valve plate 101 rigidly secured on the head of a bolt 102.

The shank of bolt 102 extends downwardly and has an adjacent, threaded, large-diameter portion 103 and a remote, smooth, smaller-diameter stem 104. A nut 105 threads on the bolt shank portion 103 to rigidly secure the bolt to the diaphragm 32 and its stiffening discs 34. The smooth stem 104 of the bolt extends in freely slidable relation into a complementary opening 106 in a plug 107 which threads into the valve plate stem 35 to rigidly secure the valve stem 35 to the diaphragm 38 and its stiffening discs 34. A compression spring 108 is mounted between the diaphragms 28 and 32 to bias them toward separation.

The operation of the embodiment of the invention illustrated in FIGURE 5 is as follows: the parts are shown in their valve-closed positions in which no control fluid pressure is supplied through the pipe 49. The valve plate 26 is therefore sealably pressed against valve seat 25 both by the bias of spring 27 and the force exerted on the diaphragm 28 by the supply fluid pressure within chamber 15. Upon application of control fluid pressure through pipe 49, fluid flows into chamber 95 and is prevented from passing through opening 96 by valve plate 101 sealing against valve seat 99 under the biasing force of the spring 108. The control fluid therefore flows into chamber 39 from chamber 95 only through the restricted opening in the metering member 54. Pressure within chamber 39 will gradually increase until the force on diaphragm 32 is sufficient to overcome the bias of spring 108 when diaphragm 32 will move downwardly without moving diaphragm 28. Diaphragm 32's movement is permitted by the sliding movement of the bolt stem 104 into the opening 106 and is against spring 108 whose bias is selected to be less than the upward force on diaphragm 28 when the valve is closed.

As the diaphragm 32 moves downwardly, the valve plate 101 uncovers the valve seat 99 to provide free passage for control fluid between chambers 95 and 39. The free movement of diaphragm 32 against spring 108 stops when the enlarged bolt shank portion 103 engages the top surface of the plug 107, whereupon the pressure in chamber 39 builds up rapidly to a value where the force on diaphragm 32 is sufficient to overcome the upward forces on valve plate 26 and quickly move diaphragm 28 and plate 26 to full open position.

When the control fluid pressure is removed from the pipe 49, the pressure within chamber 39 will be relieved immediately through the opening in valve seat 99 until the diaphragm 32 is moved upwardly by movement of diaphragm 28 into valve closing position.

It is thus seen that the embodiment of FIGURE 5 also provides for positive, rapid opening movement of the valve plate 26 since the diaphragm 32 and valve plate 101 move against the bias of spring 108 to uncover valve seat 99 before movement of the main valve plate 26 is initiated. At the critical point at which diaphragm 32 overcomes the upward forces on valve plate 26, chamber 39 has unrestricted communication with chamber 95 for rapid flow of control fluid therebetween.

While certain preferred embodiments of the invention have been specifically illustrated and described, it will be understood that the invention is not limited thereto as many variations will be apparent to those skilled in the art, and the invention is to be given its broadest interpretation within the terms of the following claims.

I claim:

1. A control valve comprising: a main body portion providing inlet and outlet chambers and a valve passage therebetween; a control diaphragm responsive to the pressure within said inlet chamber and normally biased thereby to close the valve; a valve element connected to and movable with said control diaphragm for controlling the valve passage between said chambers; a second and larger control diaphragm connected to said first diaphragm for effecting movement thereof against the force exerted thereon by the pressure in said inlet chamber; means venting the space between said diaphragms to the ambient atmosphere at all times; and a control passage for applying a control pressure to said larger diaphragm to effect opening movement of the valve, said control passage including a metering restriction to provide a predetermined delay in the build-up of pressure on said second control diaphragm whereby said valve opens a predetermined time interval after the application of a given control pressure to said control passage.

2. A control valve comprising: a main body portion providing inlet and outlet chambers and a valve passage therebetween; a control diaphragm responsive on one face only to the pressure within said inlet chamber; a valve element connected to and movable with said control diaphragm for controlling the valve passage between said chambers; a second and larger control diaphragm connected to said first diaphragm for effecting movement thereof against the force exerted thereon by the pressure in said inlet chamber; a control passage for applying a control pressure to one face only of said larger diaphragm without applying pressure to the opposite face of either diaphragm to effect opening movement of the valve, said control fluid passage including a metering restriction to provide a predetermined time delay in the build-up of pressure on said control diaphragm whereby said valve opens a predetermined time interval after the application of a given control pressure to said control passage; and a one-way passage opening freely in the reverse direction for quick movement of the control diaphragm to valve closing position upon release of control pressure thereto.

3. A fluid control valve comprising: a valve inlet; a valve outlet; a passage between said inlet and outlet; a valve element for closing said passage; a first diaphragm responsive to inlet pressure on one face only for holding said valve element in closed position; a second diaphragm responsive to a control pressure on one face only for moving the valve element to open position, said diaphrams and valve element being connected together for common movement to open and close the valve; means for controllably applying fluid pressure to said second control diaphragm without applying pressure to the opposite face of either diaphragm to effect opening and closing movements of the valve; and time delay means comprising a metering restriction in the passage supplying control fluid to said second diaphragm whereby said valve opens a predetermined time interval after the application of control pressure.

4. A fluid control valve comprising: a valve inlet; a valve outlet; a passage between said inlet and outlet; a valve element for closing said passage; a first diaphragm responsive to inlet pressure on one face only for holding said valve element in closed position; a second diaphragm responsive to a control pressure on one face only for moving the valve element to open position, said diaphrams and valve element being connected together for common movement to open and close the valve; means venting the opposite faces of said diaphragms to the ambient atmosphere at all times; means for controllably applying fluid pressure to said control diaphragm to effect opening and closing movement of the valve; time delay means comprising a restriction in the passage supplying control fluid to said control diaphragm whereby said valve opens a predetermined time interval after the application of control pressure; and a one-way passage opening freely to by-pass said restriction and allow quick movement of the control diaphragm in the valve closing direction.

5. A fluid control valve comprising: a valve inlet; a valve outlet; a passage between said inlet and outlet; a valve element for closing said passage; diaphragm means responsive to inlet pressure for holding said valve element in closed position; means for controllably applying control fluid pressure to said diaphragm means to effect opening movement of the valve element; time delay means comprising a metering restriction in the passage supplying control fluid to said diaphragm means whereby said valve opens a predetermined time interval after the application of control pressure; and means for insuring positive, rapid movement of the valve element to open position when the control pressure acting against said diaphragm means reaches a predetermined value.

6. A fluid control valve comprising: a valve inlet; a valve outlet; a passage between said inlet and outlet; a valve element for closing said passage; diaphragm means responsive to inlet pressure for holding said valve element in closed position; means for controllably applying control fluid pressure to said diaphragm means to effect opening movement of the valve element; time delay means comprising a metering restriction in the passage supplying control fluid to said diaphragm means whereby said valve opens a predetermined time interval after the application of control pressure; and means for insuring positive, rapid movement of the valve element to open position when the control pressure acting against said diaphragm means reaches a predetermined value, said last mentioned means including a normally closed by-pass around said restriction and means for opening said by-pass when the pressure on said diaphragm means reaches said predetermined value.

7. A fluid control valve comprising: a valve inlet; a valve outlet; a passage between said inlet and outlet; a valve element for closing said passage; diaphragm means responsive to inlet pressure for holding said valve element in closed position; means for controllably applying control fluid pressure to said diaphragm means to effect opening movement of the valve element; time delay means comprising a metering restriction in the passage supplying control fluid to said diaphragm means whereby said valve opens a predetermined time interval after the application of control pressure; and means for insuring positive, rapid movement of the valve element to open position when the control pressure acting against said diaphragm means reaches a predetermined value, said last mentioned means including a normally closed by-pass passage around said restriction and means for opening said by-pass passage prior to valve element opening action of said diaphragm means.

8. A fluid control valve comprising: a valve inlet; a valve outlet; a passage between said inlet and outlet; a valve element for closing said passage; diaphragm means responsive to inlet pressure for holding said valve element in closed position; means for controllably applying control fluid pressure to said diaphragm means to effect opening movement of the valve element; time delay means comprising a metering restriction in the passage supplying control fluid to said diaphragm means whereby said valve opens a predetermined time interval after the application of control pressure; an auxiliary passage paralleling said restriction; means normally closing said auxiliary passage; an independent diaphragm subjected to the control pressure acting on said diaphragm means; and means interconnecting said independent diaphragm and said means closing said auxiliary passage to effect opening of said auxiliary passage for free flow of the control fluid when the pressure acting on said diaphragm reaches a predetermined value less than the value required to effect valve opening movement of said diaphragm means.

9. A fluid control valve comprising: a valve inlet; a valve outlet; a passage between said inlet and outlet; a valve element for closing said passage; diaphragm means responsive to inlet pressure for holding said valve element in closed position; means for controllably applying control fluid pressure to said diaphragm means to effect opening movement of the valve element; time delay means comprising a metering restriction in the passage supplying control fluid to said diaphragm means whereby said valve opens a predetermined time interval after the application of control pressure; an auxiliary passage paralleling said restriction; means normally closing said auxiliary passage; an independent diaphragm subjected to the control pressure acting on said diaphragm means; means interconnecting said independent diaphragm and said means closing said auxiliary passage to effect opening of said auxiliary passage for free flow of the control fluid when the pressure acting on said diaphragm means reaches a predetermined value less than the value required to effect valve opening movement of said diaphragm means; spring means opposing the operation of said independent diaphragm; and means for adjusting the bias of said spring means to adjust said predetermined value of control pressure a which said independent diaphragm means operates to open said auxiliary passage.

10. A fluid control valve comprising: a valve inlet; a valve outlet; a passage between said inlet and outlet; a valve element for closing said passage; a first diaphragm responsive to inlet pressure for holding said valve element in closed position; a second diaphragm responsive to a control pressure for moving the valve element to open position; a lost motion connection between said first and second diaphragms providing for limited relative movement therebetween; spring means between said diphragms biasing them separated; means for controllably applying fluid pressure to said second diaphragm to exert a force thereon in the valve opening direction; time delay means comprising a metering restriction in the passage suplying control fluid to said second diaphragm to delay valve opening a predtermined time interval after the application of control pressure; an auixliary passage paralleling said restriction; and means controlled by the separated position of said second diaphragm for closing said auxiliary passage until the second diaphragm begins to move toward the first diaphragm against the spring biasing them separated.

11. A fluid control valve comprising: a valve inlet; a valve outlet; a passage between said inlet and outlet; a valve element for closing said passage; a first diaphragm responsive to inlet pressure for holding said valve element in closed position; a second diaphragm responsive to a control pressure for moving the valve element to open position; a lost motion connection between said first and second diaphragms providing for limited relative movement therebetween; spring means between said diaphragms biasing them separated; means for controllably applying fluid pressure to said second diaphragm to exert a force thereon in the valve opening direction; time delay means comprising a metering restriction in the passage supplying control fluid to said second diaphragm to delay valve opening a predetermined time interval after the application of control pressure; an auxiliary passage paralleling said restriction; and means controlled by the separated position of said second diaphragm for closing said auxiliary passage until the second diaphragm begins to move toward the first diaphragm against the spring biasing them separated, the bias of said spring being selected to provide for auxiliary passage opening movement of the second diaphragm before the force exerted thereby on the first diaphragm is sufficient to effect valve opening movement of the valve element.

12. A fluid control valve comprising: a valve inlet; a valve outlet; a pasage between said inlet and outlet; a valve element for closing said passage; a first diaphragm responsive to inlet pressure for holding said valve element in closed position; a second diaphragm responsive to a control pressure for moving the valve element to open position; a lost motion connection between said first and second diaphragms providing for limited relative movement therebetween; spring means between said diaphragms biasing them separated; means for controllably applying fluid pressure to said second diaphragm to exert a force thereon in the valve opening direction; time delay means comprising a metering restriction in the passage supplying control fluid to said second diaphragm to delay valve opening a predetermined time interval after the application of control pressure; an auxiliary passage paralleling said restriction; means controlled by the separated position of said second diaphragm for closing said auxiliary passage until the second diaphragm begins to move toward the first diaphragm against the spring biasing them separated, the bias of said spring being selected to provide for auxiliary passage opening movement of the second diaphragm before the force exerted thereby on the first diaphragm is sufficient to effect valve opening movement of the valve element; and means positively limiting the movement of the second diaphragm toward the first diaphragm so that they engage and move together to open the valve after opening of said auxiliary passage.

References Cited by the Examiner

UNITED STATES PATENTS

| 2,340,954 | 2/1944 | Garretson | 137—494 X |
| 3,126,911 | 3/1964 | Galley | 137—495. |

FOREIGN PATENTS

| 708,693 | 5/1954 | Great Britain. |
| 645,673 | 6/1937 | Germany. |

M. CARY NELSON, *Primary Examiner.*

A. JAFFE, E. FEIN, *Assistant Examiners.*